United States Patent [19]

Hasegawa et al.

[11] 4,351,600
[45] Sep. 28, 1982

[54] FLASH OUTPUT CONTROL FAILURE WARNING DEVICE OF AN AUTOMATIC FLASH OUTPUT CONTROL SPEED LIGHT

[75] Inventors: Hiroshi Hasegawa; Osamu Maida, both of Tokyo, Japan

[73] Assignee: Nippon Kogaku K. K., Japan

[21] Appl. No.: 302,072

[22] Filed: Sep. 14, 1981

Related U.S. Application Data

[63] Continuation of Ser. No. 226,013, Jan. 19, 1981, abandoned.

[30] Foreign Application Priority Data

Jan. 13, 1980 [JP] Japan .................................. 55/10702

[51] Int. Cl.$^3$ ............................................. G03B 17/18
[52] U.S. Cl. .................................. 354/60 L; 354/128
[58] Field of Search ................. 354/60 E, 60 F, 60 L, 354/127, 128, 53

[56] References Cited

U.S. PATENT DOCUMENTS 3,706,911  12/1972  Wilwerding ........................ 315/158
3,999,193  12/1976  Hasegawa ........................... 354/33

*Primary Examiner*—Michael L. Gellner
*Attorney, Agent, or Firm*—Shapiro and Shapiro

[57] ABSTRACT

A flash output control photography failure warning device in a camera is provided with a quantity-of-light detecting circuit adapted to start operating in synchronism with shutter release and to change from a first condition to a second condition when the integrated amount of the light from an object reaches a predetermined value, a time counting circuit for counting a predetermined time $T_2$ greater than the longest light emission time of a flashlight discharge tube in synchronism with shutter release, a memory circuit adapted to start memorizing the condition of the quantity-of-light detecting circuit after the longest light emission time of the flashlight discharge tube and before the predetermined time $T_2$ and to memorize it till a predetermined time $T_3$, a discrimination circuit for discriminating that the condition of the quantity-of-light detecting circuit memorized by the memory circuit at a point of time whereat the time counting circuit has counted the predetermined time $T_2$ is the first condition and putting out a failure signal, and warning means controlled by the failure signal of the discrimination circuit.

16 Claims, 9 Drawing Figures

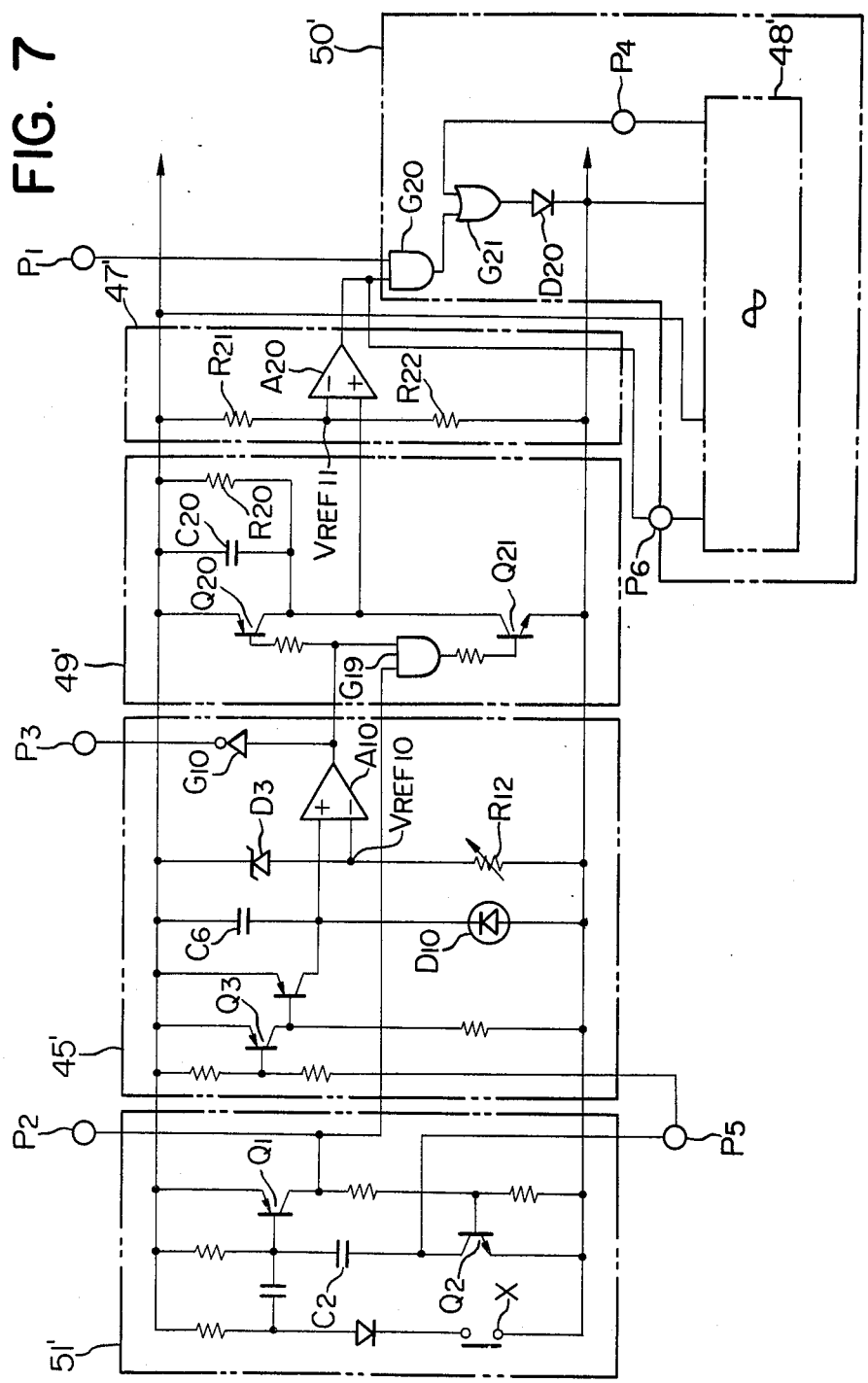

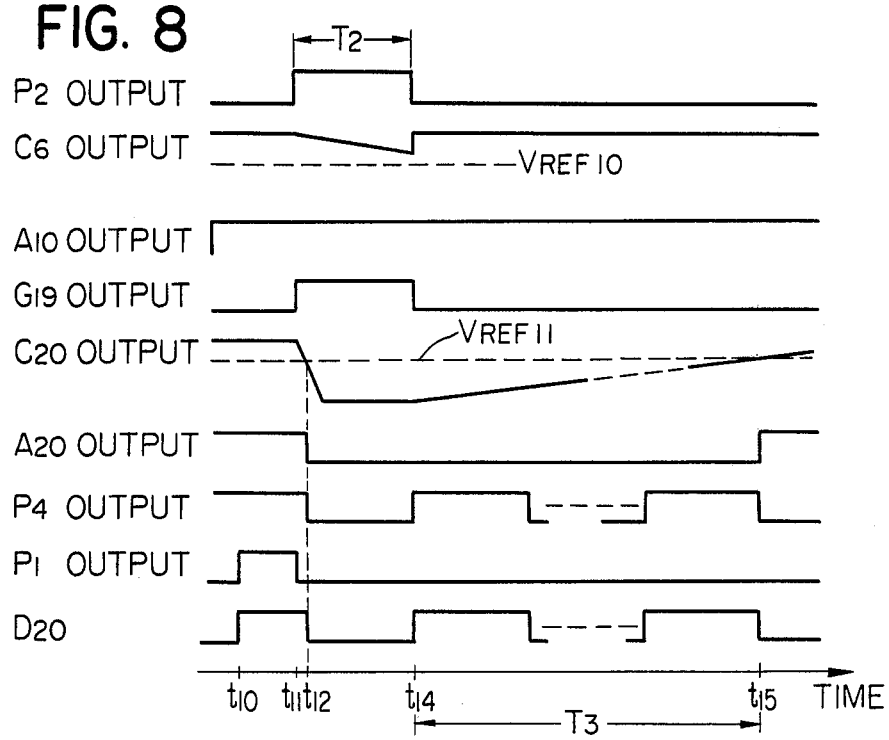
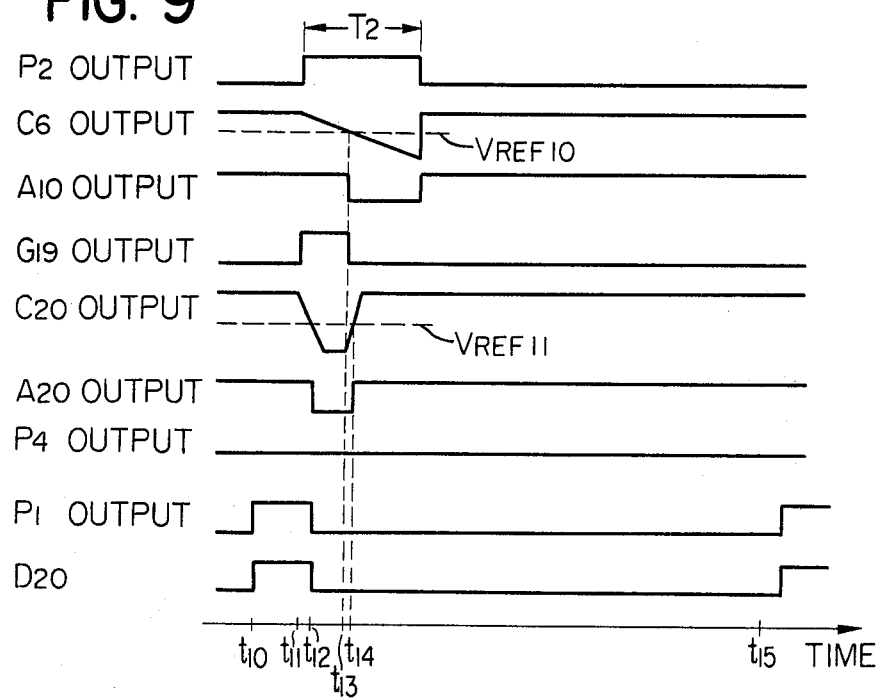

FLASH OUTPUT CONTROL FAILURE WARNING DEVICE OF AN AUTOMATIC FLASH OUTPUT CONTROL SPEED LIGHT

This is a continuation application of Ser. No. 226,013, filed Jan. 19, 1981, now abandoned.

BACKGROUND OF THE INVENTION

1. Field of the Invention

This invention relates to a flash output control failure warning device of an automatic flash output control speed light.

2. Description of the Prior Art

A typical serial control type automatic flash output control speed light includes a main discharge tube adapted to consume the charge stored in a main discharge capacitor and emit flashlight, a light-receiving element for receiving the reflection of the light emitted from the main discharge tube by an object and decreasing the resistance value thereof, and a thyristor (SCR) disposed in the discharge path between the main discharge tube and the main discharge capacitor, and is designed such that when the integrated value of the current flowing to the light-receiving element reaches a predetermined value, the thyristor is turned off to prevent the discharge of the main discharge capacitor, thereby discontinuing the light emission of the main discharge tube. That is, by controlling the light emission time of the main discharge tube, the quantity of light emitted therefrom is controlled. However, when an object to be phototaken lies at a relatively far distance, the reflection of the light emitted from the main discharge tube by the object is small and accordingly, the operation of the main discharge tube terminates before a desired quantity of emitted light is obtained. In other words, before the integrated value of the current flowing to the light-receiving element reaches a predetermined value, the operation of the main discharge tube terminates and the flash output control operation is not effected and results in a failure. In such a case, there has been a disadvantage that the erroneous photography resulting from an under-exposure cannot be discovered until film is developed, because the conventional automatic flash output control speed light does not have the function of confirming the flash output control operation. Accordingly, if the function of confirming the flash output control operation could be given to an automatic flash output control speed light, it would become possible to discover erroneous photography and the usefulness of the automatic flash output control speed light would be greatly enhanced. This also holds true of a parallel control type automatic flash output control speed light. Techniques which enable, when it is detected that the thyristor has been turned off (or that the integrated value of the photocurrent has reached a predetermined value), the display of the fact that the flash output control operation has been effected, namely, that the flash output control has been successful have been proposed by U.S. Pat. Nos. 3,706,911 and 3,999,193.

However, usually, failure of automatic flash output control occurs very rarely as compared with success of automatic flash output control and therefore, the system of displaying success of automatic flash output control as has heretofore been done is rather onerous to the photographer. Also, what is important to the photographer is to know a failure rather than a success. Accordingly, a warning device which positively calls the photographer's attention during failure of automatic flash output control photography would be desirable.

SUMMARY OF THE INVENTION

In order to overcome the above-noted disadvantages, the present invention intends to provide a circuit suited for the detection of failure of automatic flash output control, thereby facilitating to give warning of the failure of automatic flash output control.

It is an object of the present invention to provide a warning device which positively gives warning to the photographer and calls his attention during failure of flash output control.

It is another object of the present invention to provide a warning device which begins to give warning always after the lapse of a predetermined time after a release button has been operated and terminates the warning after the lapse of a predetermined time.

It is still another object of the present invention to provide a warning device which gives warning even for a failure of such a kind that the flashlight discharge tube has emitted no light.

The invention will become fully apparent from the following detailed description thereof taken in conjunction with the accompanying drawings.

BRIEF DESCRIPTION OF THE DRAWINGS

FIG. 7 is a circuit diagram of another embodiment of the present invention.

FIGS. 8 and 9 are operation timing charts of the circuit example shown in FIG. 7.

DESCRIPTION OF THE PREFERRED EMBODIMENTS

Figure 1:
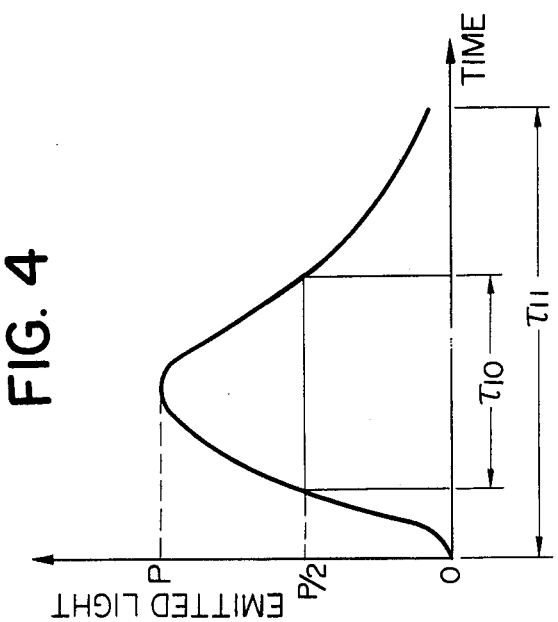
FIG. 1 is a block diagram showing the construction of the circuit of the present invention.

FIG. 1 is a block diagram showing the basis of the present invention.

In FIG. 1, the flash output control detecting circuit of the present invention is shown in block diagram. This circuit comprises a quantity-of-light detecting circuit 1 having a first condition and a second condition and adapted to assume the second condition when the quantity of light illuminating an object reaches a predetermined value; a memory circuit 2 for memorizing in which of the first and second conditions the quantity-of-light detecting circuit is; a time counting circuit 3 for producing a first signal in synchronism with the release of a camera after lapse of a predetermined time corresponding to the maximum light emission time of the speed light; and a discrimination circuit 4 for receiving the first signal as input and discriminating the success or failure of the automatic flash output control, after lapse of said predetermined time, in accordance with which of the conditions of the quantity-of-light detecting circuit the memory circuit memorizes. The discrimination circuit detects the failure of the automatic flash output control when the memory circuit memorizes the first condition of the quantity-of-light detecting circuit after lapse of the predetermined time, and detects the success of the automatic flash output control when the memory circuit memorizes the second condition of the quantity-of-light detecting circuit. The success or failure of the automatic flash output control is warned by warning means 5 including a display circuit or a warning sound circuit.

Figure 2:
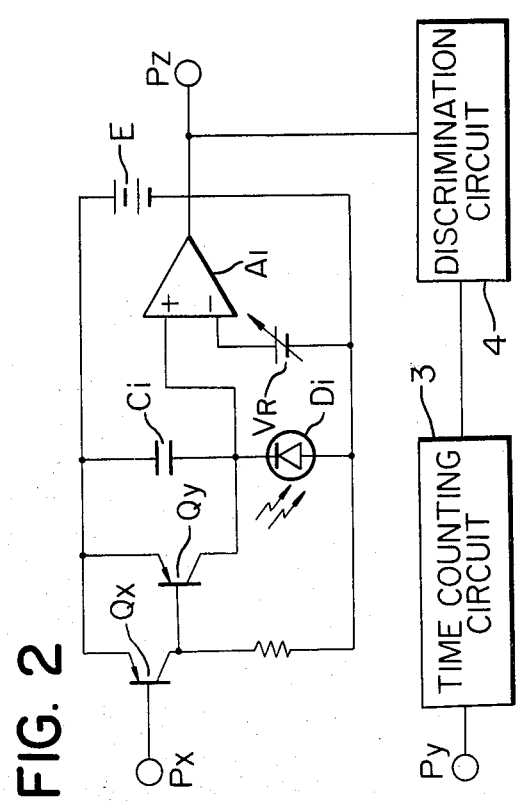
FIG. 2 is a circuit diagram of an embodiment of the present invention.

FIG. 2 shows an example of the circuit carrying out the present invention. In FIG. 2, a complementary signal is applied to terminals Px and Py in synchronism with the closing of a synchro contact for a predetermined period Tx. That is, by the closing of the synchro contact, the terminals Px and Py are maintained at L and H, respectively, for a predetermined period. When the terminal Px assumes L, a transistor Qx is turned on and a transistor Qy is turned off, and a quantity-of-light integrating circuit comprising a capacitor Ci and a photodiode Di operates. When the charging voltage of the capacitor Ci becomes lower than a reference voltage VR, a comparator $A_1$ generates L. The output L of this comparator $A_1$ is transmitted to a flash output control stopping circuit (not shown) through a terminal Pz and is used for the flashlight emission stoppage (automatic flash output control). When the charging voltage of the capacitor Ci is not lower than the reference voltage VR, the output of the comparator $A_1$ is H. The output of the comparator $A_1$ is applied to the discrimination circuit 4.

When the terminal Py assumes H, the time counting circuit 3 provides thereto a predetermined time (TY) delay corresponding to the longest light emission time of a flashlight emitting device and applies it to the discrimination circuit 4. Here, if the condition that Tx>TY is set, the automatic flash output control operation is terminated before the lapse of the period Tx. Between the lapse time of TY to the lapse time of Tx, the output of the comparator $A_1$ holds and memorizes the condition of H or L in accordance with the charging voltage of the capacitor Ci.

Accordingly, if the output of the comparator $A_1$ is H at a point of time whereat the output of the time counting circuit 3 has become H after lapse of the time TY, the discrimination circuit 4 can determine the failure of the automatic flash output control, and if the output of the comparator $A_1$ is L at a point of time whereat the output of the time counting circuit 3 has become H, the discrimination circuit can determine the success of the automatic flash output control. Thereafter, at a point of time whereat the terminal Px has assumed H, the transistor Qy is turned on to short-circuit the capacitor Ci and reset one input of the comparator $A_1$. The transistors Qx, Qy, capacitor Ci, photodiode Di and comparator $A_1$ together constitute a quantity-of-light detecting and memory circuit.

Figure 3:
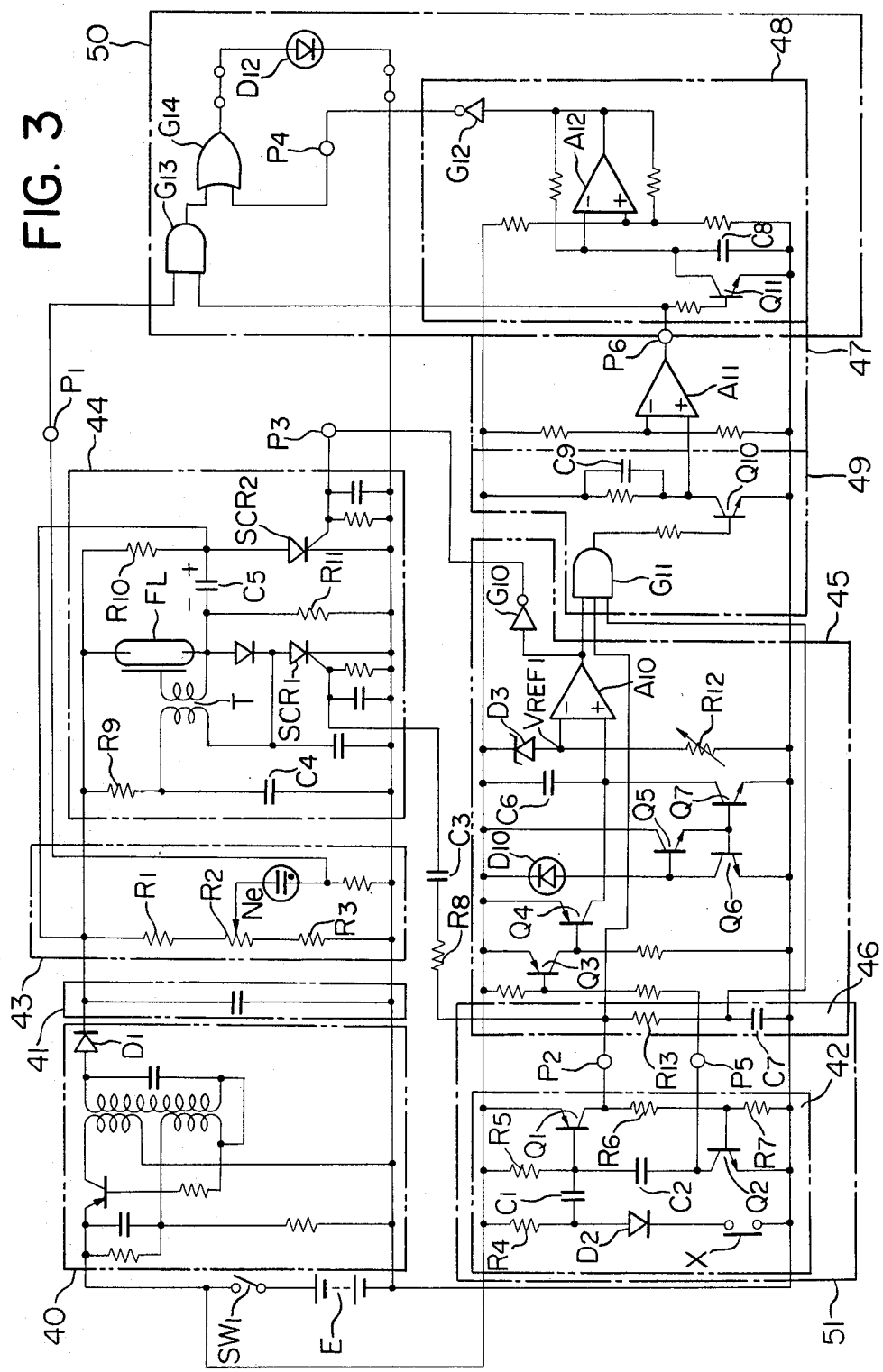
FIG. 3 is a more detailed circuit diagram of the embodiment of the present invention.

The invention will hereinafter be described with respect to an embodiment thereof. FIG. 3 is a circuit diagram showing an embodiment of the present invention. In FIG. 3, there are conventionally provided a DC-DC converter 40, a main capacitor 41, a trigger circuit 42, a charging voltage detecting circuit 43 and a light emission control circuit 44. When a main switch $SW_1$ is closed in the DC-DC converter 40, a blocking oscillation circuit is operated and the voltage of a DC power source E is made into an AC voltage and boosted, and this is rectified by a diode $D_1$ to charge the main capacitor 41. The charging voltage of the main capacitor 41 is divided by a voltage dividing circuit $R_1$–$R_3$ and applied to a neon tube Ne. When the charging of the main capacitor 41 is completed and the charging voltage thereof becomes sufficient for flashlight emission, the neon tube Ne is turned on. At this time, the divisional voltage by the voltage dividing circuit $R_1$–$R_3$ is produced at a terminal $P_1$. It is to be understood that when this voltage has been produced, the terminal $P_1$ is at H and when this voltage has not been produced, the terminal $P_1$ is at L.

Next, when the synchro contact X of the camera is closed, a one-shot multivibrator comprising transistors $Q_1$, $Q_2$, capacitors $C_1$, $C_2$, resistors $R_4$–$R_7$ and diode $D_2$ is operated and a voltage substantially equal to the power source voltage is produced at the collector of the transistor $Q_1$ as the output thereof. When this voltage has been produced, a terminal $P_2$ connected to the collector of the transistor $Q_1$ is at H and a terminal $P_5$ is at L. On the other hand, the collector of the transistor $Q_1$ is AC-coupled to the gate of a thyristor $SCR_1$ through a resistor $R_8$ and a capacitor $C_3$. Accordingly, by the turn-on of the transistor $Q_1$, the thyristor $SCR_1$ becomes turned on and the discharging path of a trigger capacitor $C_4$ which has so far been charged through a resistor $R_9$ is formed through the primary winding of a trigger transformer T. Therefore, a high voltage is produced across the secondary winding of the trigger transformer and, by this high voltage, a flashlight discharge tube FL is excited to start flashlight emission. The object is directly or indirectly illuminated by this flashlight. Part of this illuminating light becomes an object-reflected light and enters the photodiode $D_{10}$ of a quantity-of-light detecting circuit 45.

At this time, in the quantity-of-light detecting circuit 45, a terminal $P_5$ assumes L, whereby a transistor $Q_3$ is turned on and a transistor $Q_4$ is turned off. Therefore, a current mirror circuit comprising transistors $Q_5$–$Q_7$ causes a current output corresponding to the photocurrent of a photodiode $D_{10}$ to flow to the collector of the transistor $Q_7$. An integrating capacitor $C_6$ is charged by this collector current. A reference voltage $V_{REF1}$ determined by a reference voltage circuit comprising a zener diode $D_3$ and a variable resistor $R_{12}$ whose resistance value is variable by film speed or the like is applied to the inverting input terminal of a comparator $A_{10}$, and the terminal voltage of the integrating capacitor $C_6$ is applied to the non-inverting input terminal of the comparator $A_{10}$. The terminal voltage of the integrating capacitor $C_6$ becomes lower with charging, but if it is higher than the reference voltage $V_{REF1}$, the comparator $A_{10}$ produces H. When this terminal voltage soon becomes lower than the reference voltage $V_{REF1}$, the comparator $A_{10}$ generates L. This output L is inverted into H by an inverter $G_{10}$ and therefore, a terminal $P_3$ assumes H. Accordingly, a thyristor $SCR_2$ is turned on. Here, a commutation capacitor $C_5$ is pre-charged to the shown polarity through resistors $R_{10}$ and $R_{11}$ and therefore, when the thyristor $SCR_2$ is turned on, the thyristor $SCR_1$ is reversely biased by the voltage of this commutation capacitor $C_5$ and turned off. As a result, the flashlight emission is discontinued and thus, automatic flash output control has been accomplished. When automatic flash output control cannot be effected by the reason that the distance to the object is too far, the output of the inverter $G_{10}$ remains at L.

Detection of the success or failure of automatic flash output control will now be described. A delay circuit 46 comprising a resistor $R_{13}$ and a capacitor $C_7$ delays the output of the terminal $P_2$ by a predetermined time. An AND gate $G_{11}$ receives as inputs the output of the terminal $P_2$, the output of the comparator $A_{10}$ and the output of the delay circuit 46.

Figure 4:
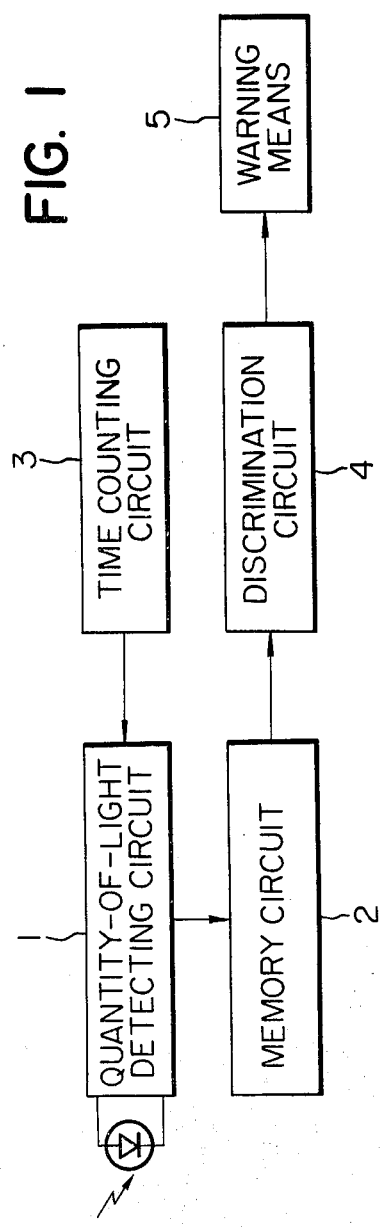
FIG. 4 is a graph illustrating the flashlight emission characteristic of a speed light.

When the time during which the terminal $P_2$ generates H is $T_1$ and the time from after the terminal $P_2$ has produced H until the delay circuit 46 generate H is $T_2$, the trigger circuit 42 and the delay circuit 46 constitute the time counting circuit so that $T_1 > T_2$. Also, the time $T_2$ is set to a predetermined time greater than the longest light emission time of the flashlight discharge tube FL. As the longest light emission time, the times $\tau_{10}$ and $\tau_{11}$ typically represented in FIG. 4 which shows the light emission characteristic of the flashlight discharge tube FL may be mentioned. The time $\tau_{10}$ is the time from after the emitted flashlight has reached $\frac{1}{2}$ of the peak value P thereof until it again returns to $\frac{1}{2}$ of the peak value P, and the time $\tau_{11}$ is the time from the start of the flashlight emission till the termination of the flashlight emission (full light emission).

In a discrimination circuit 47 constituted by a comparator $A_{11}$ and a reference voltage circuit comprising a serial circuit of two resistors, when the AND gate $G_{11}$ of a memory circuit 49 comprising an AND gate $G_{11}$, a transistor $Q_{10}$ and a capacitor $C_9$ generates H, the transistor $Q_{10}$ is turned on with a result that the comparator $A_{11}$, namely, the output terminal $P_6$ of the discrimination circuit, generates L and, when the AND gate $G_{11}$ produces L, the transistor $Q_{10}$ is turned off with a result that the comparator $A_{11}$, namely, the output terminal $P_6$ of the discrimination circuit, generates H. In an oscillation circuit 48, when the output terminal $P_6$ of the discrimination circuit 47 is at H, a transistor $Q_{11}$ is turned on to short-circuit a capacitor $C_8$ and therefore the output produced at a terminal $P_4$ is L, and when the output terminal $P_6$ of the discrimination circuit 47 is at L, the transistor $Q_{11}$ is turned off and therefore, the output produced at the terminal $P_4$ repeats L and H. Accordingly, the output terminal $P_6$ of the discrimination circuit 47 provides a terminal for controlling the operation of the oscillation circuit 47. Also, the terminal $P_4$ is connected to one input terminal of an OR gate $G_{14}$, and the output terminal of an AND gate $G_{13}$ to whose input terminals are connected the output terminal of the discrimination circuit 47 and the voltage detecting terminal $P_1$ of a main capacitor 41 is connected to the other input terminal of the OR gate $G_{14}$. The output of the OR gate $G_{14}$ is connected to a warning element $D_{12}$, and the AND gate $G_{13}$, the OR gate $G_{14}$ and the warning element $D_{12}$, together with the oscillation circuit 48, constitute warning means 50. A light-emitting diode is used herein as the warning element, but a warning sound device appealing to the auditory sense such as a piezoelectric buzzer may also be used as such element.

Figure 5:
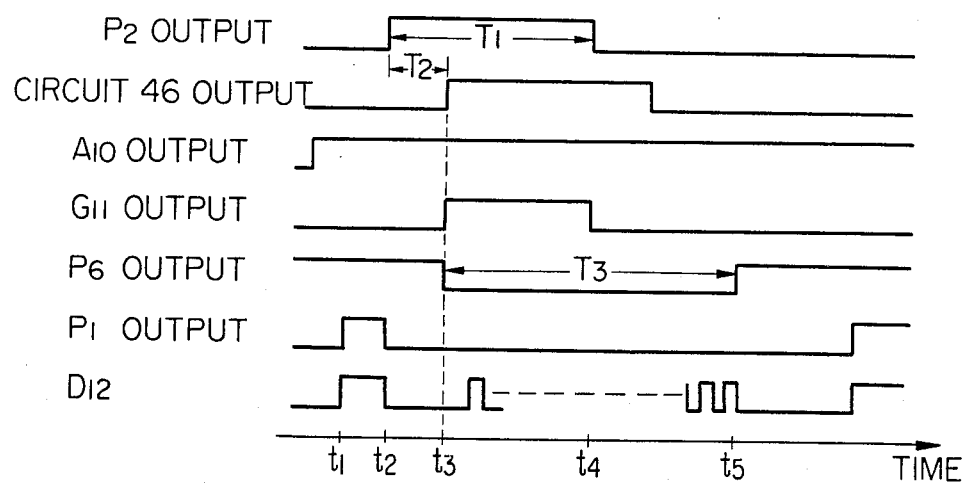
FIGS. 5 and 6 are operation timing charts of the circuit example shown in FIG. 3.
Figure 6:
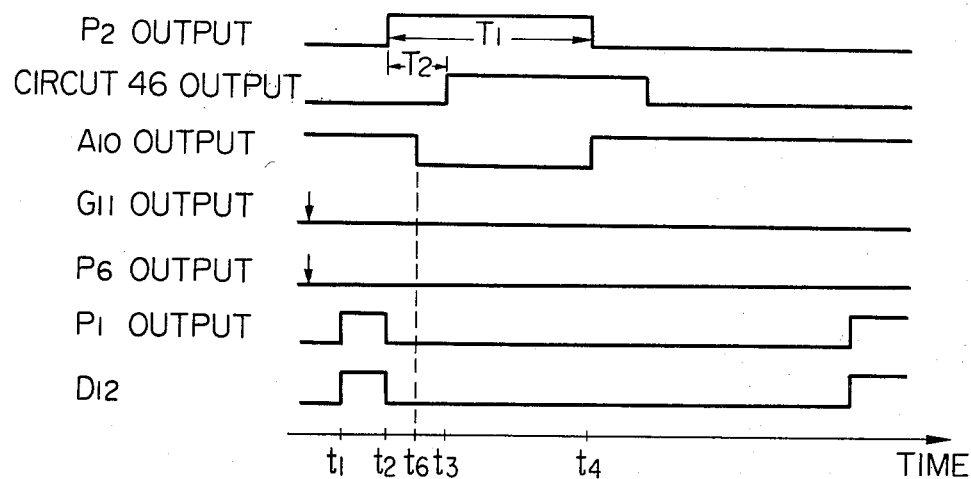

Operation will now be described in detail by reference to FIGS. 5 and 6. When the charging of the main capacitor 41 is completed at a time $t_1$, the output of the terminal $P_1$ is H. Also, the AND gate $G_{11}$ produces L, the comparator $A_{11}$ generates H and the terminal $P_4$ generates H. Therefore, the AND gate $G_{13}$ and the OR gate $G_{14}$ produce H and a light-emitting diode $D_{12}$ is turned on to annunciate the completion of the preparation for flashlight emission. When the synchro contact X is closed at a time $t_2$, the flashlight emission is started as previously described. At this time, the terminal voltage of the main capacitor 41 drops and therefore, the terminal $P_1$ assumes L with a result that the light-emitting diode $D_{12}$ is turned off. The operation after this will be described with respect to a case where automatic flash output control has failed and a case where automatic flash output control has been successful.

(i) Failure of automatic flash output control (see FIG. 5): In this case, the charging voltage of capacitor $C_6$ does not reach a predetermined value and therefore, the output of the comparator $A_{10}$ continues to generate H. This comparator $A_{10}$ continues to produce H as long as the output of terminal $P_2$ is H. Therefore, the AND gate $G_{11}$ does not generate H until the output of the delay circuit 46 becomes H at a time $t_3$ which is the lapse of time $T_2$. Even after this time $t_3$, the comparator $A_{10}$ continues to produce H, and even when the output of terminal $P_5$ becomes H at a time $t_4$ which is the lapse of time $T_1$ and the transistor $Q_3$ is turned off while the transistor $Q_4$ is turned on to short-circuit the capacitor $C_6$, the comparator $A_{10}$ still continues to produce H. This occurs because the capacitor $C_6$ has not been charged until the output of the comparator $A_{10}$ is inverted. Thus, the comparator $A_{10}$ memorizes the automatic flash output control failure (the fact that the charging voltage of the capacitor $C_6$ has not reached a predetermined value) even after the time $t_3$ after the lapse of the predetermined time $T_2$ which is greater than the longest light emission time of the flashlight discharge tube FL.

$C_9$ is charged for the time during which $G_{11}$ produces H and $Q_{10}$ is turned on, namely, for $T_1-T_2$.

This AND gate $G_{11}$ generates L when the terminal $P_2$ of the trigger circuit 42 assumes L at a time $t_4$, whereby transistor $Q_{10}$ is turned off and capacitor $C_9$ which has so far been charged discharges in accordance with a time constant determined by a parallel-connected resistor, and gradually increases the input terminal voltage of the comparator $A_{11}$, and the comparator $A_{11}$ continues to generate L till a time $t_5$ when the voltage preset by the reference voltage circuit is exceeded, and therefore continues to turn off transistor $Q_{11}$. Accordingly, the oscillation circuit 48 starts to oscillate after the terminal $P_6$ has assumed L and the transistor $Q_{11}$ has been turned off, and generates L and H alternately to terminal $P_4$, thus turning on and off the light-emitting diode $D_{12}$. By this, failure of automatic flash output control is displayed. This turn-on-and-off continues for a memory time $T_3$ until the charging voltage of capacitor $C_9$ inverts the comparator $A_{11}$, and is discontinued at a time $t_5$ before the completion of the charging of the main capacitor 41. This memory time $T_3$ can be freely selected within a relatively long time range until the main capacitor 41 during full light emission is completely charged. It is to earn the time required to start the operation of the circuit 47 that $T_1 > T_2$.

(ii) Success of automatic flash output control (see FIG. 6): In this case, at the time $t_6$ between the time $t_2$ and the time $t_3$, the charging voltage of the capacitor $C_6$ reaches a predetermined value and the output of the comparator $A_{10}$ becomes L and the output of the AND gate $G_{11}$ continues to produce L. The period during which the output of the comparator $A_{10}$ is L is from the time $t_2$ until transistor $Q_4$ is turned on to short-circuit the integrating capacitor $C_6$ at the time $t_4$ which is the lapse of time $T_1$. That is, during this period, success of automatic flash output control is memorized. Therefore, even if the output of the delay circuit 46 becomes H at the time $t_3$, the output of the AND gate $G_{11}$ remains to be L. Accordingly, the light-emitting diode $D_{12}$ remains turned off at the time $t_2$ and this provides the display of success of flash output control.

FIG. 7 is a circuit diagram showing another embodiment of the present invention. In FIG. 7, a time counting circuit 51' is similar to the trigger circuit 42 shown in FIG. 3, but is designed such that H is produced at terminal $P_2$ for a predetermined time longer than said longest light emission time after the synchro contact X has been closed. A quantity-of-light detecting circuit 45' is similar in construction to that of FIG. 2 except that the integrating capacitor $C_6$ is directly charged with the photocurrent of photodiode $D_{10}$. Designated by 48' is an oscillation circuit.

Operation will hereinafter be described by reference to FIGS. 8 and 9.

(i) Failure of automatic flash output control (see FIG. 8):

When the synchro contact X is open, transistors $Q_1$ and $Q_2$ are turned off and therefore, terminal $P_2$ assumes L and terminal $P_5$ assumes H. Therefore, transistor $Q_3$ is turned off and transistor $Q_4$ is turned on to short-circuit the integrating capacitor $C_6$ and comparator $A_{10}$ generates H. At this time, and AND gate $G_{19}$ which receives as inputs the output of the comparator $A_{10}$ and the output of the terminal $P_2$ produces L. Accordingly, transistors $Q_{20}$ and $Q_{21}$ are both turned off with a result that capacitor $C_{20}$ is reset to its completely uncharged condition through resistor $R_{20}$, and comparator $A_{20}$ generates H. When the output of the comparator $A_{20}$ is H, the terminal $P_4$ is at L. In this condition, when the charging of the main capacitor 41 is completed at a time $t_{10}$ and terminal $P_1$ assumes H, both AND gate $G_{20}$ and OR gate $G_{21}$ produce H and turn on a light-emitting diode $D_{20}$, thus annunciating the completion of the preparation for light emission.

Now, when the synchro contact X is closed at a time $t_{11}$ after the light-emitting diode $D_{20}$ has been turned on, terminal $P_2$ assumes H and terminal $P_5$ assumes L. This condition is maintained for a period $T_2$ till a time $t_{14}$ when the charging of capacitor $C_2$ is completed. By the closing of the synchro contact X, the flashlight discharge tube FL emits flashlight which illuminates the object. Due to the terminal $P_5$ assuming L, transistor $Q_4$ is turned off, so that the integrating capacitor $C_6$ is charged with the photocurrent of photodiode $D_{10}$ which receives the object light. Comparator $A_{10}$ continues to produce H until this chrging voltage becomes lower than the reference voltage. At the time $t_{11}$, terminal $P_1$ assumes L and therefore, the output of AND gate $G_{20}$ becomes L, and terminal $P_4$ is also at L and therefore the output of OR gate $G_{21}$ becomes L, thus turning off the light-emitting diode $D_{20}$. When terminal $P_2$ generates H, AND gate $G_{19}$ produces H to turn on transistor $Q_{21}$. Therefore, capacitor $C_{20}$ is rapidly charged and, when the terminal voltage of the capacitor $C_{20}$ becomes lower than the reference voltage $V_{REF11}$ determined by resistors $R_{21}$ and $R_{22}$, the comparator $A_{20}$ generates L at that time $t_{12}$.

The oscillation circuit 48 starts to operate by the L output of the comparator $A_{20}$, but by adjusting the oscillation period to make the OFF time longer than time $T_2$, the light-emitting diode $D_{20}$ is not actually turned on from the time $t_{11}$ till a time $t_{14}$ which is the lapse of time $t_2$.

Now, in the case of failure of automatic flash output control, even if time $T_2$ has elapsed, the terminal voltage of the integrating capacitor $C_6$ does not become lower than the reference voltage $V_{REF10}$ and therefore, comparator $A_{10}$ is not inverted but continues to produce H, and AND gate $G_{19}$ generates L at the time $t_{14}$ when terminal $P_2$ produces L and as a result, transistor $Q_{21}$ is turned off. On the other hand, transistor $Q_{20}$ is in OFF state and therefore, capacitor $C_{20}$ discharges through resistor $R_{20}$, and comparator $A_{20}$ continues to produce L until the terminal voltage of the capacitor $C_{20}$ exceeds the reference voltage $V_{REF11}$. Thus time $T_3$ from time $t_{14}$ to $t_{15}$ is the memory time during which failure of automatic flash output control is memorized. This time $T_3$ can freely be lengthened within a relatively long time until the main capacitor 41 which has almost used up its energy due to the full light emission of the flashlight discharge tube FL is again completely charged, and during that time, by the output of the oscillation circuit 48', the light-emitting diode $D_{20}$ is turned on and off to annunciate failure of automatic flash output control. When the terminal voltage of the capacitor $C_{20}$ becomes higher than the reference voltage $V_{REF11}$ at a time $t_{15}$, the comparator $A_{20}$ produces H and therefore, the light-emitting diode $D_{20}$ is turned off.

In the present embodiment, the memory circuit 49' starts memorization from the time $t_{14}$ which is the lapse of a predetermined time $T_2$, but the time for starting memorization may be any time from after the lapse of the longest light emission time of the flashlight discharge tube till the time $t_{14}$ which is the lapse of said predetermined time $T_2$.

(ii) Success of automatic flash output control (see FIG. 9): In this case, at a time $t_{13}$ during time $T_2$, the output of comparator $A_{10}$ becomes L to turn on the thyristor $SCR_2$ and discontinue the flashlight emission of the flashlight discharge tube FL. At this time, AND gate $G_{19}$ produces L to turn off transistor $Q_{21}$, but the L output of the comparator $A_{10}$ turns on transistor $Q_{20}$. Thereupon, capacitor $C_{20}$ rapidly discharges through the transistor $Q_{20}$. Therefore, in a moment, the output of comparator $A_{20}$ becomes H to render the oscillation circuit 48 inoperative. The H of the comparator $A_{20}$ is memorized as the success of automatic flash output control until transistor $Q_{21}$ is turned on. If, at this time, terminal $P_1$ is at H, the light-emitting diode $D_2$ will be turned on to immediately indicate that the flashlight photography can be effected and, if terminal $P_1$ is at L, the light-emitting diode $D_{20}$ will be turned off until the terminal $P_1$ assumes H, thereby indicating that the preparation for flashlight photography is not yet completed.

The present embodiment has been shown with respect to a case where a single light-emitting diode is used both as the display element annunciating the completion of the charging of the main capacitor and the display element annunciating the failure of flash output control. The completion of the charging is identified by continuous turn-on and the failure of flash output control is identified by turn-on-and-off, but the completion of the charging may be identified by turn-on-and-off and the failure of flash output control may be identified by continuous turn-on. Also, the warning element for the completion of the charging and the warning element for the failure of flash output control may be individually provided.

According to the present invention, as has been described above, it is possible to positively give a warning during failure of flash output control and when the warning is given, the warning is started always in a predetermined time after the operation of the release button and is terminated after lapse of a predetermined time. Further, the warning can also be given when the flashlight discharge tube has emitted no light.

We claim:

1. A flash output control photography failure warning device in a camera characterized by:
   a quantity-of-light detecting circuit adapted to start operating in synchronism with shutter release and to change from a first condition to a second condition when the integrated amount of the light from an object reaches a first predetermined value;
   a time counting circuit for counting a predetermined time ($T_2$) greater than the longest light emission time of a flashlight discharge tube in synchronism with shutter release;
   a memory circuit adapted to start memorizing the condition of said quantity-of-light detecting circuit after the longest light emission time of the flashlight discharge tube and before said first predetermined time ($T_2$) and to memorize it till a second predetermined time ($T_3$);
   a discrimination circuit for discriminating that the condition of the quantity-of-light detecting circuit memorized by said memory circuit at a point of time whereat said time counting circuit has couned said first predetermined time ($T_2$) is the first condition and generating a failure signal; and
   warning means controlled by the failure signal of said discrimination circuit.

2. A warning device according to claim 1, wherein said quantity-of-light detecting circuit comprises a capacitor, a photoconductor, a comparator, a reference voltage circuit and a transistor, the serial junction between said capacitor and said photoconductor being connected to one input terminal of said comparator, said reference voltage circuit being connected to the other input terminal of said comparator, the emitter-collector of said transistor being parallel-connected to said capacitor, the ON-OFF of said transistor being controlled by the output signal of said time counting circuit, and the output of said comparator is the output of said quantity-of-light detecting circuit.

3. A warning device according to claim 1, wherein said memory circuit comprises a capacitor, a resistor, a first transistor, a second transistor and an AND circuit, a circuit of parallel connection of said capacitor, said resistor and the emitter-collector of said first transistor is series-connected to the emitter-collector of said second transistor, the output of said quantity-of-light detecting circuit is connected to the base of said first transistor, and the output terminal of said AND circuit receiving as inputs the output of said time counting circuit and the output of said quantity-of-light detecting circuit is connected to the base of said second transistor.

4. A warning device according to claim 1, wherein said discrimination circuit comprises a comparator and a reference voltage circuit, the output of said memory circuit is connected to one input terminal of said comparator and said reference voltage circuit is connected to the other input terminal of said comparator.

5. A warning device according to claim 1, wherein said warning means includes an oscillation circuit and a warning element, said oscillation circuit being controlled by the signal of said discrimination circuit, said warning element being controlled by the output of said oscillation circuit.

6. A warning device according to claim 5, wherein said oscillation circuit is started by the failure signal of said discrimination circuit and continues to oscillate during the memory time of said memory circuit.

7. A warning device according to claim 5, wherein said warning element is provided with a single warning element common to a warning element for annunciating the completion of the charging of a main capacitor, and the difference between the both warnings is identified by whether the warning is a continuous signal or an intermittent signal controlled by said oscillation circuit.

8. A warning device according to claim 7, wherein said warning means further includes an AND circuit and an OR circuit, the output of said discriminating circuit is connected to one input terminal of said AND circuit and the start terminal ($P_6$) of said oscillation circuit, the voltage detecting terminal ($P_1$) of the main capacitor is connected to the other input terminal of said AND circuit, the output of said AND circuit is connected to one input terminal of said OR circuit, the output terminal of said oscillation circuit is connected to the other input terminal of said OR circuit, and the single warning element is connected to the output terminal of said OR circuit.

9. A flash output control photography failure warning device in a camera characterized by:
   a quantity-of-light detecting circuit adapted to start operating in synchronism with shutter release and to change from a first condition to a second condition when the integrated amount of the light from an object reaches a predetermined value;
   a time counting circuit for counting a first predetermined time ($T_2$) greater than the longest light emission time of a flashlight discharge tube in synchronism with shutter release;
   a memory circuit adapted to start memorizing the condition of said quantity-of-light detecting circuit at least before said first predetermined time ($T_2$) and to memorize it until a second predetermined time ($T_3$);
   a discrimination circuit for discriminating that the condition of the quantity-of-light detecting circuit memorized by said memory circuit at a point in time at which said time counting circuit has counted said first predetermined time ($T_2$) is the first condition and for generating a failure signal; and
   warning means controlled by the failure signal of said discrimination circuit.

10. A warning device according to claim 9, wherein said quantity-of-light detecting circuit comprises a capacitor, a photoconductor, a comparator, a reference voltage circuit and a transistor, a serial junction between said capacitor and said photoconductor being connected to one input terminal of said comparator, said reference voltage circuit being connected to another input terminal of said comparator, the emitter-collector of said transistor being parallel-connected to said capacitor, the ON-OFF condition of said transistor being controlled by the output signal of said time counting circuit, and the output of said comparator being the output of said quantity-of-light detecting circuit.

11. A warnind device according to claim 9, wherein said memory circuit comprises a capacitor, a resistor, a first transistor, a second transistor and an AND circuit, a circuit of parallel-connection of said capacitor, said resistor and the emitter-collector of said first transistor being series-connected to the emitter-collector of said second transistor, the output of said quantity-of-light detecting circuit being connected to the base of said first transistor, and the output terminal of said AND circuit which receives as inputs the output of said time counting circuit and the output of said quantity-of-light detecting circuit being connected to the base of said second transistor.

12. A warning device according to claim 9, wherein said discrimination circuit comprises a comparator and a reference voltage circuit, the output of said memory circuit being connected to one input terminal of said comparator and said reference voltage circuit being connection to another input terminal of said comparator.

13. A warning device according to claim 9, wherein said warning means includes an oscillation circuit and a warning element, said oscillation circuit being controlled by the signal from said discrimination circuit and said warning element being controlled by an output of said oscillation circuit.

14. A warning device according to claim 13, wherein said oscillation circuit is started by the failure signal of said discrimination circuit and the oscillation circuit continues to oscillate during the memory time of said memory circuit.

15. A warning device according to claim 13, wherein said warning element is provided with a single warning element which also serves as a warning element for annunciating the completion of the charging of a main capacitor, the difference between the warnings being identified by whether the warning is a continuous signal or an intermittent signal controlled by said oscillation circuit.

16. A warning device according to claim 15, wherein said warning means further includes an AND circuit and an OR circuit, the output of said discrimination circuit being connected to one input terminal of said AND circuit and a start terminal of said oscillation circuit, a voltage detecting terminal of the main capacitor being connected to another input terminal of said AND circuit, the output of said AND circuit being connected to one input terminal of said OR circuit, the output terminal of said oscillation circuit being connected to another input terminal of said OR circuit, and the single warning element being connected to the output terminal of said OR circuit.

* * * * *